INVENTOR.
SANAE AMADA
et al

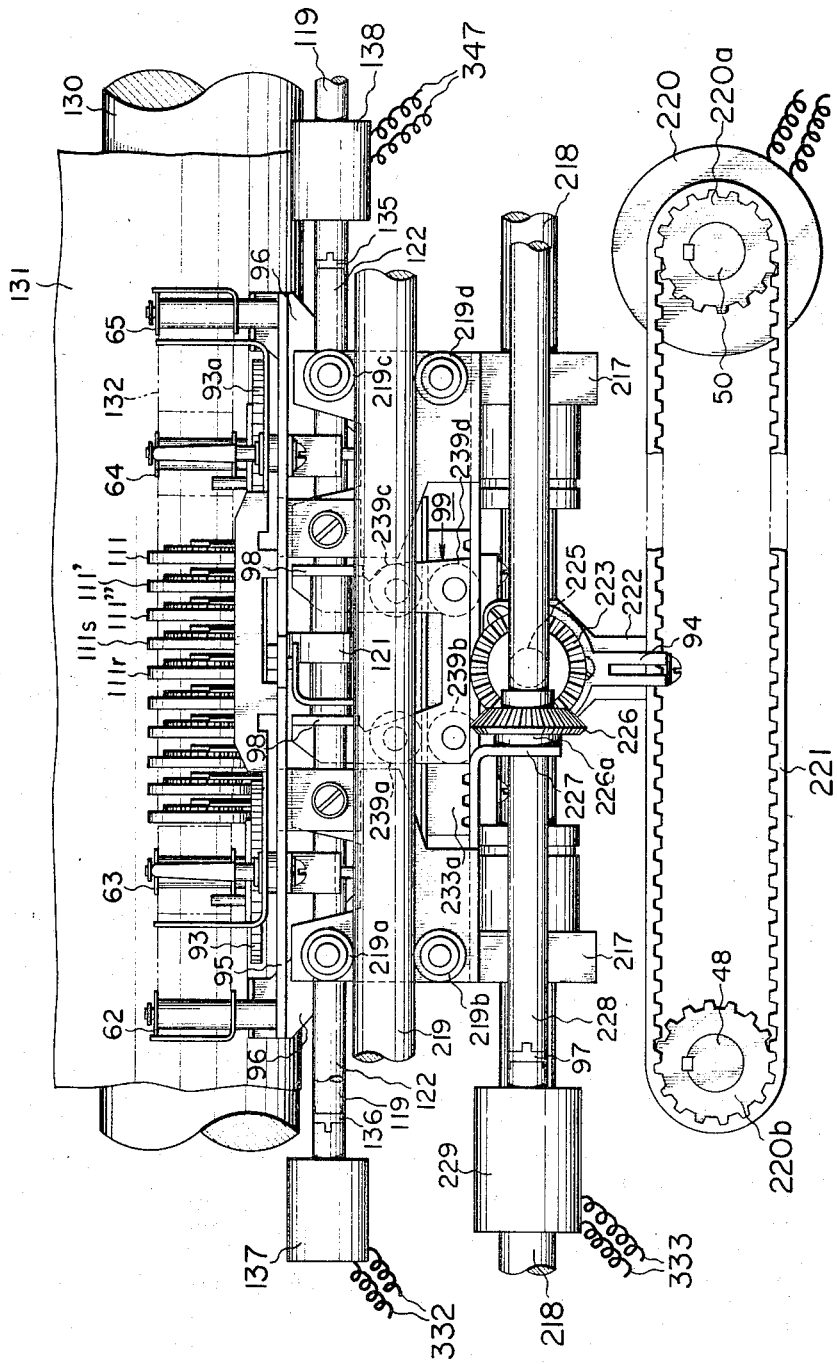

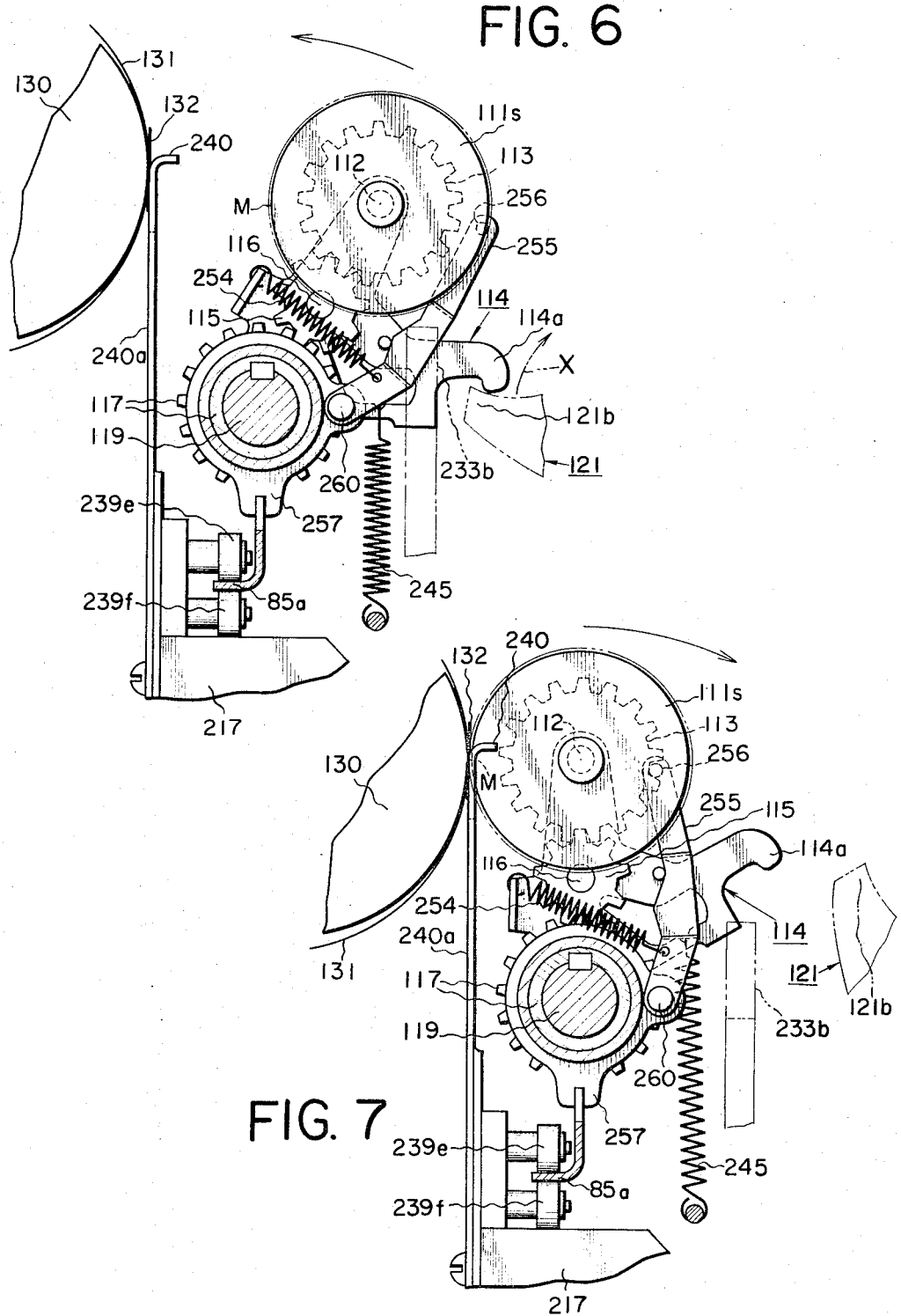

FIG. 11

FIG. 13
FIG. 16 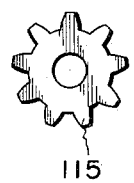  FIG. 17 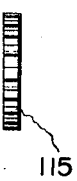
FIG. 14 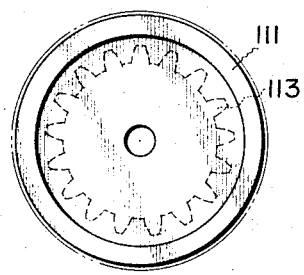  FIG. 15 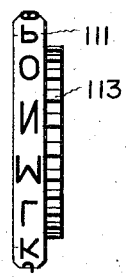
FIG. 18 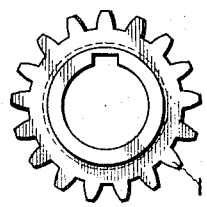  FIG. 19 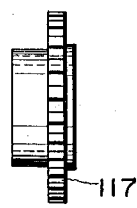

United States Patent Office 3,353,648
Patented Nov. 21, 1967

3,353,648
TYPEWRITER WITH TYPEWHEEL AND HAMMER
MOUNTED ON MOVABLE CARRIAGE
Sanae Amada, Reijiro Kawano, Masatsugu Arakawa, and
Hiroshi Iwano, Kanagawa-ken, Japan, assignors to
Fujitsu Limited, Kanagawa-ken, Japan, a corporation of
Japan, and Kurosawa Tele-Communications Limited,
Tokyo, Japan, a corporation of Japan
Filed Aug. 30, 1966, Ser. No. 576,000
Claims priority, application Japan, Aug. 31, 1965,
40/53,254
3 Claims. (Cl. 197—55)

ABSTRACT OF THE DISCLOSURE

A power driven typewriter having a plurality of rotatable typewheels wherein said typewheels, the type levers, the carriage means and the hammer means are all positively driven to accurately locate said elements relative to each other.

---

This invention relates to improvements in and relating to typewriter machines, especially for use in high speed typewriting such as telecommunication and the like.

In using the old-fashioned typewriter provided with a type basket comprising a number of type bars, the operational speed is extremely low which means that this kind of machine does not meet the urgent demand for high speed operation required in the telecommunication or the like.

In order to meet such demand as this, a highly advanced typewriter fitted with a rotatable type ball carrying thereon as many as 88 types has been proposed and is at present in wide practical use. This type of machine has the grave drawback that the number of types to be used is highly limited.

The main object is therefore to provide a high speed typewriter machine capable of being fitted with 192 characters or more.

A further object is to provide a machine of the kind above referred to, capable of performing the type selecting and typing operation in an extremely quick manner for instance at a speed of 1200 words per minute or higher.

Still further object is to provide an efficient typewriter machine of the kind above referred to, which is highly compact in its design and reliable in its function.

These and further objects, features and advantages of the invention will become apparent when reading the following detailed description by reference to the accompanying drawings illustrating a preferred embodiment of the invention to be set forth in no limiting sense thereof.

Figure 1:
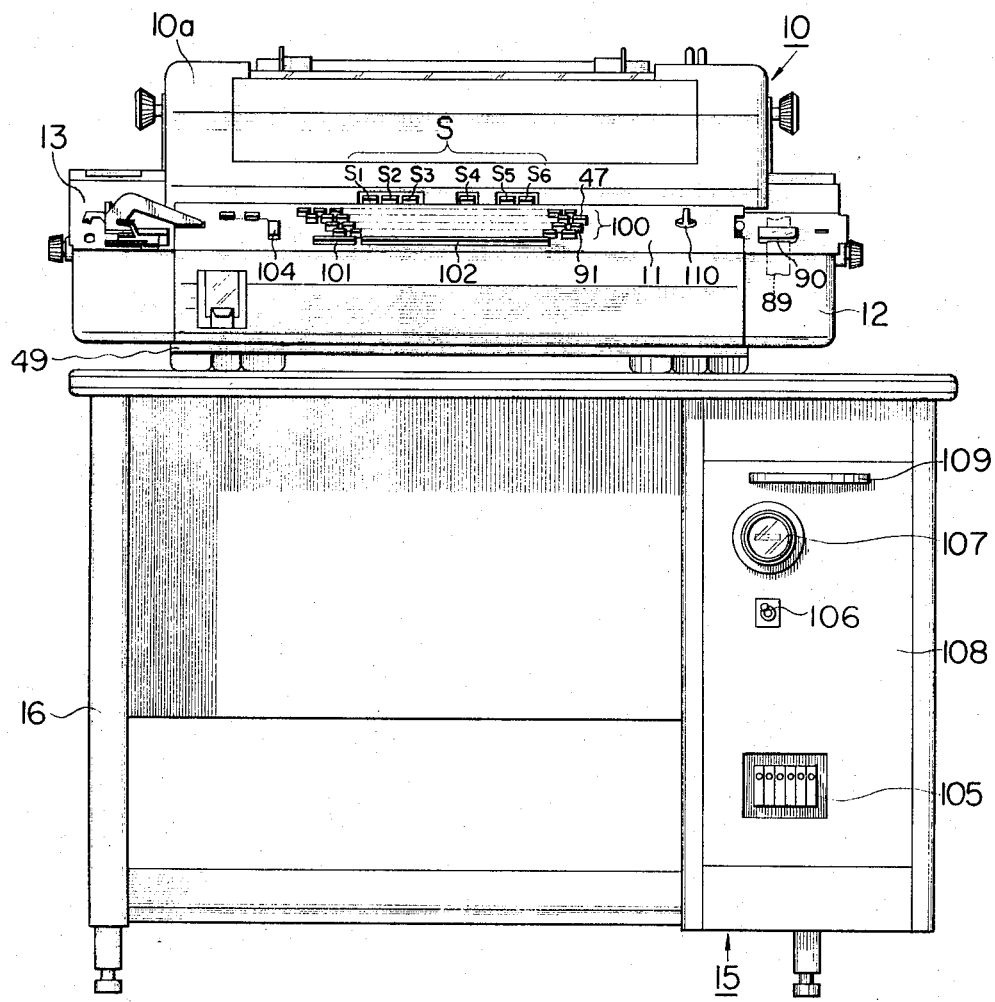
Figure 2:
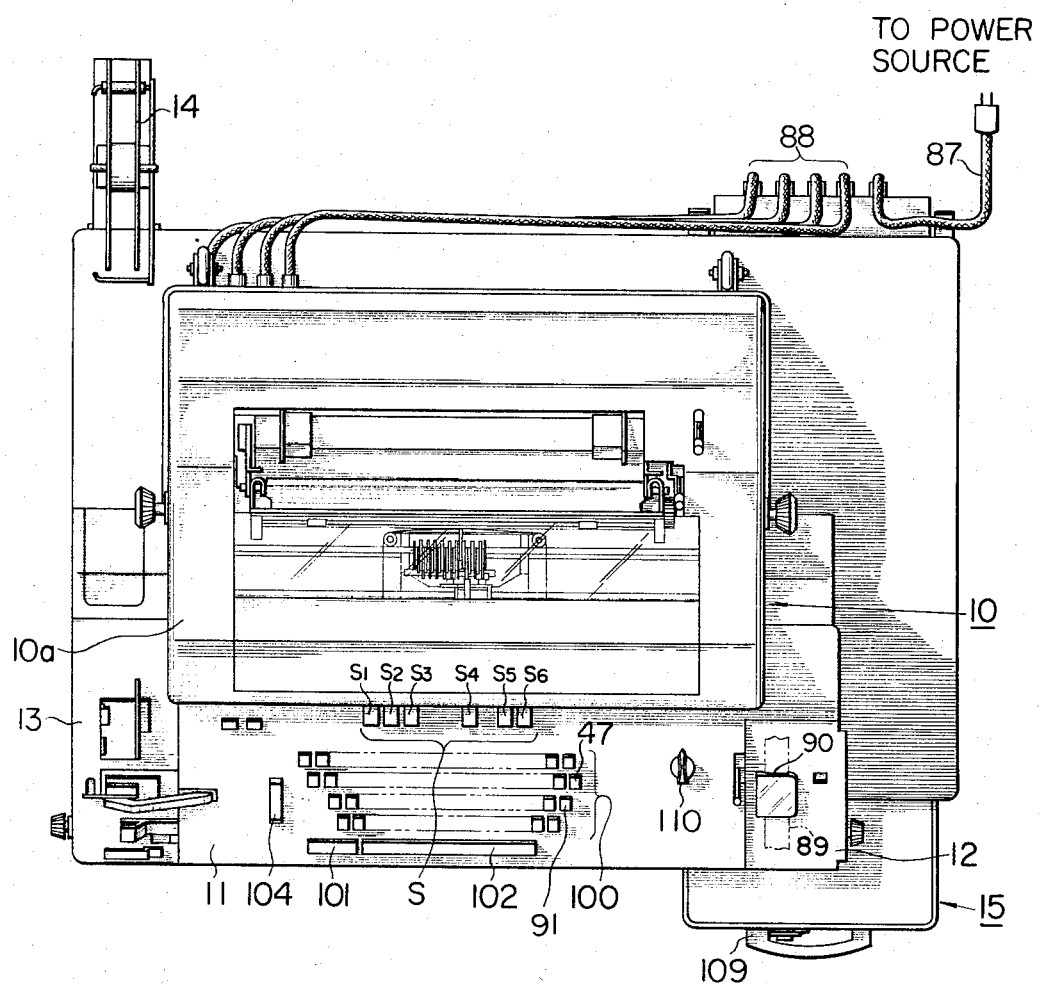
Figure 3:
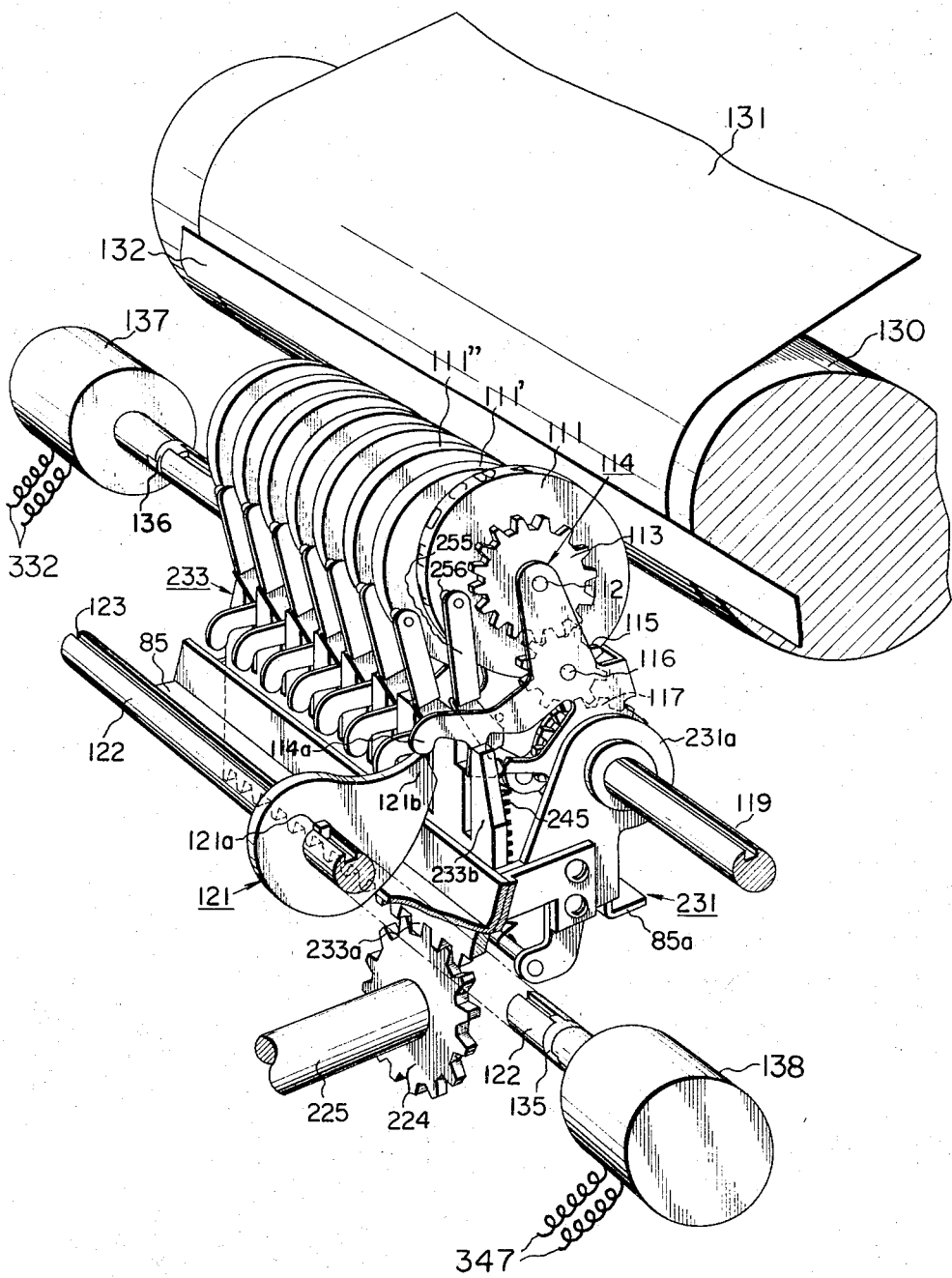
Figure 4:
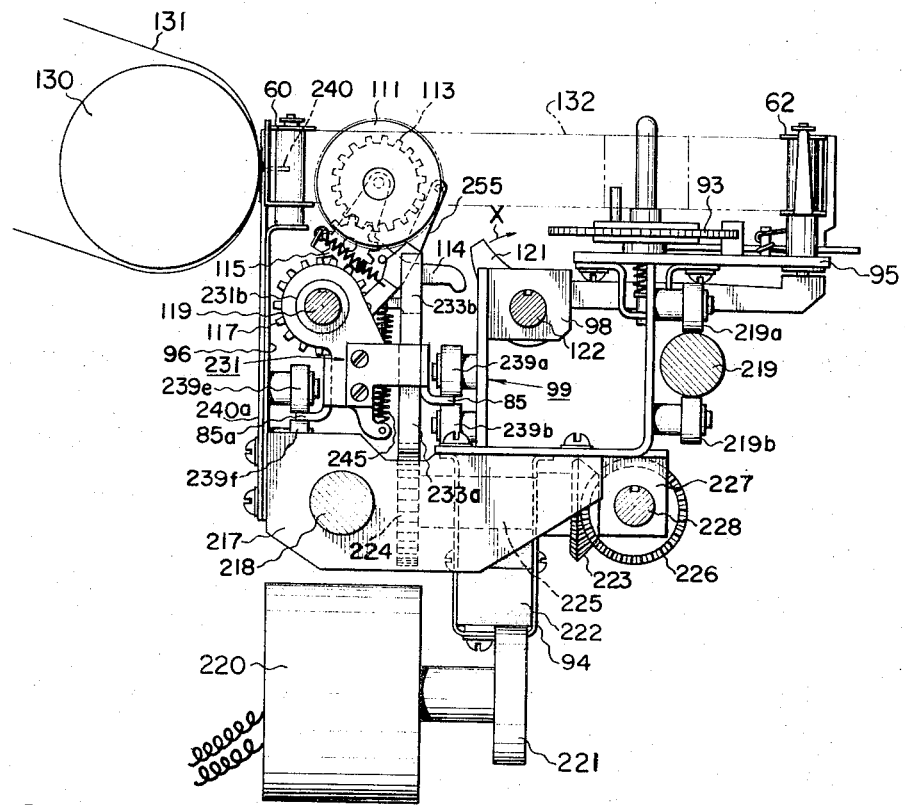
Figure 9:
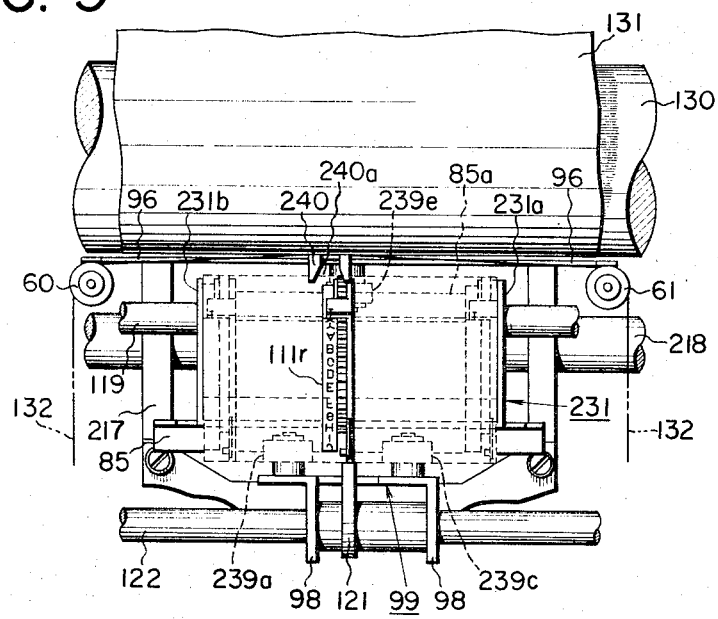
Figure 10:
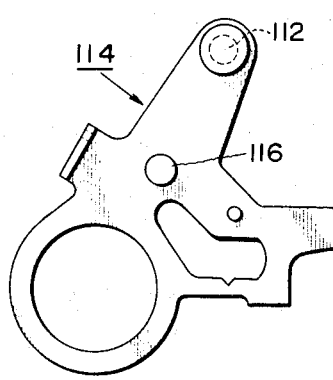
Figure 8:
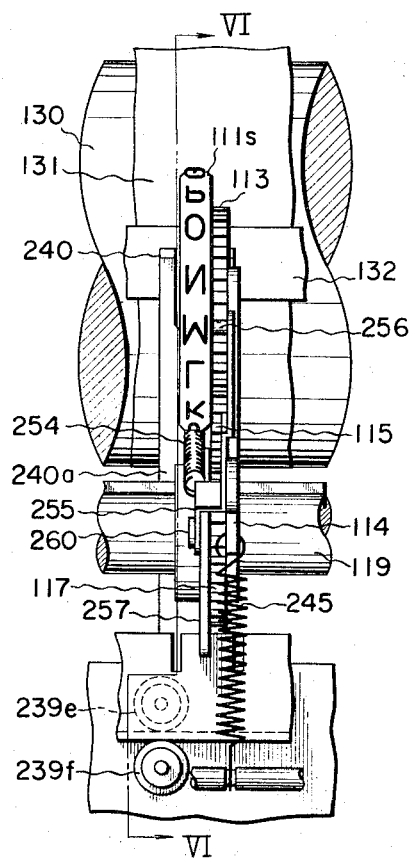

In the drawings:
FIG. 1 is a front view of the typewriter machine embodying the principle of the invention.
FIG. 2 is a top plan view thereof.
FIG. 3 is a perspective view of main working parts of input-output typewriter unit employed.
FIG. 4 is an end view thereof, wherein however several shafts are shown in section.
FIG. 5 is a front view thereof, wherein however several related parts are additionally shown.
FIGS. 6 and 7 are end views of a selected-out typewheel and its several related parts in two different positions, wherein however a shaft and the like are shown in section.
FIG. 8 is a front view thereof.
FIG. 9 is a top plan view of the mechanism substantially shown in FIG. 3.
FIG. 10 is a side view of a type lever.
FIG. 11 is a front view thereof.

Figure 12:
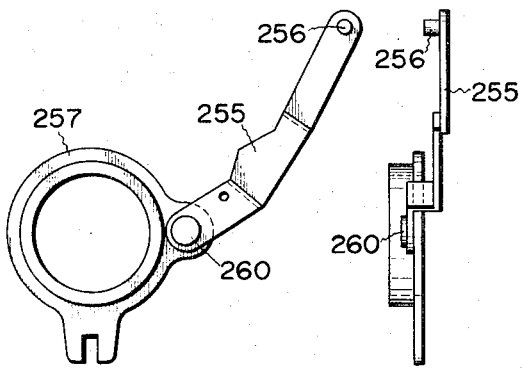
Figure 20:
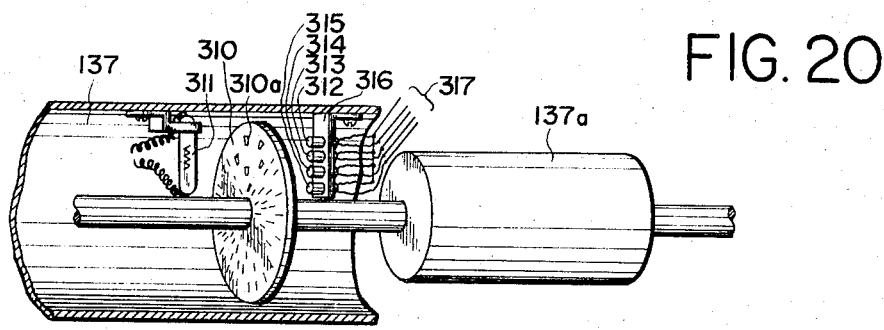
Figure 21:
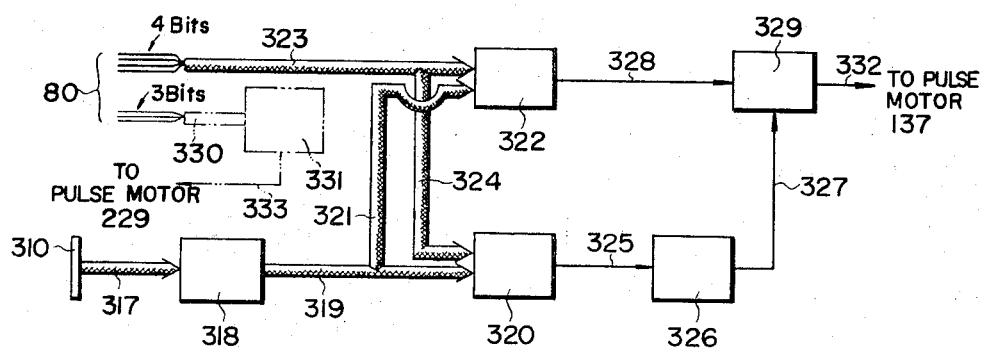
Figure 22:
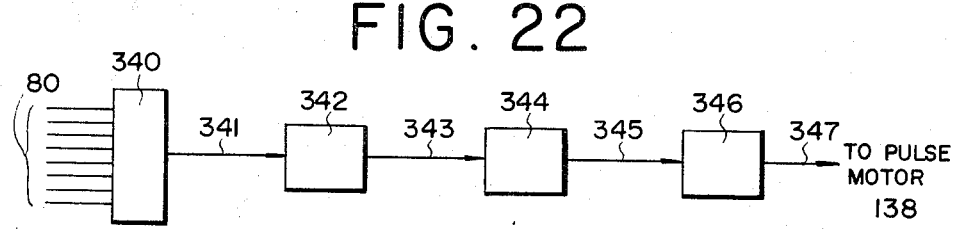
Figure 23:
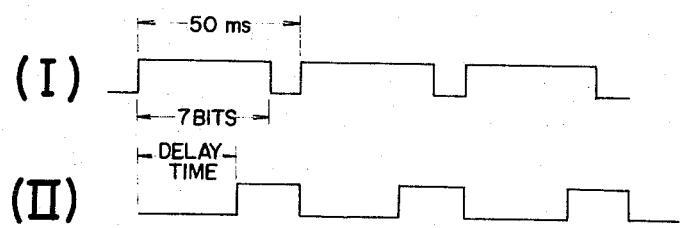

FIG. 12 is a side view of a detent lever and its mounting ring.
FIG. 13 is a front view thereof.
FIG. 14 is a side view of a unit comprising a typewheel and a gear fixedly attached thereto.
FIG. 15 is a front view thereof.
FIG. 16 is a side view of an intermediate gear to be kept in meshing with said typewheel gear shown in FIGS. 14–15.
FIG. 17 is a front view thereof.
FIG. 18 is a side view of a type-selector gear to be kept in meshing relation with intermediate gear shown in FIG. 16–17.
FIG. 19 is a front view thereof.
FIG. 20 is a schematic and explanatory view of a photoelectric sensing means for pulse motor employed.
FIG. 21 is a schematic and explanatory view, illustrating an electronic type selection control means employed in the present machine.
FIG. 22 is a block diagram of an electronic type hammer drive control means employed.
FIG. 23 is a chart illustrative of two kinds of pulse signal appearing in the circuit shown in FIG. 22.

Now referring to the accompanying drawings, especially FIGS. 1 and 2, numeral 10 represents generally an input-output typewriter unit which houses therein main working parts of the typewriter according to this invention. At the front of the unit 10, there is a conventional keyboard unit, generally denoted 11, carrying thereon a group of conventional keys at 100, tabulation bar 101, space bar 102, a series of various switches, commonly denoted "S," and a tab-set and clear lever 104, all these components being only schematically represented. Switch group S comprises tape and edge card feed switch $s1$, alarm clear switch $s2$, reset switch $s3$, reader start switch $s4$, reader stop switch $s5$ and three-space switch $s6$.

Numeral 110 is a four-position switch for the selection of any one of four main operations of the machine: programming operation, type-only operation mode, punch-only operation mode, and type-and-punch combined operation mode. At the right hand side of the keyboard unit, when seen in FIG. 1 there is provided a reader section 12, while at the left hand side of said unit 10, a perforator section 13. Said units 10 and 11 and said sections 12 and 13 constitute in combination the upper part of the machine which is rigidly mounted on a stand 16 a part of which constitutes a combined control and power supply unit 15. On the rear side of the machine upper part, a tape reel 14 is rotatably mounted to feed a tape to be punched, as will be later described. On the control part of the combined unit 15, there are provided fuse box 105, main power on-off switch 106 and powered time integrator 107 mounted on a drawer 108 fitted with a manipulating handle 109.

FIG. 3 shows the main working parts contained in the input-output typewriter unit 10. Numerals 111, 111', 111" . . . denote a plurality, preferably 12, of typewheels rotatably supported by respective pins or shafts 112 which are mounted on respective supporting brackets 114 having respective follower arms 114a.

A gear 113 is fixedly and concentrically attached to the respective typewheels, as will be clearly seen in FIG. 3 in connection with the first typewheel 111. This construction applies however, to all other type wheels. Numeral 115 represents an intermediate gear supported rotatably on its shaft 116 which is supported in turn rigidly on the bracket 114 for the first typewheel 111, said intermediate gear being kept in meshing engagement with gears 113 and 117. This construction applies also to all other typewheels. Gears 117 are mounted slidably along a rotatable shaft 119, yet non-rotatable relatively thereto.

This construction will be further described hereinafter with reference to FIGS. 4, 6 and 7.

Pulse motor 137, the housing of which is rigidly mounted on the housing 10a of unit 10, although not shown, has its rotor drivingly connected through a shaft coupling 136, to said shaft 119 for rotation thereof through a specifically selected partial revolution when pulses are fed to the motor, as will be later described by reference to FIG. 21.

It will be understood from the foregoing that when the shaft 119 is rotated through a selected angle in the above-mentioned manner, all the typewheels will be rotated the same angle in unison with each other through the intermediary of respective gearing 113, 115 and 117. This operation is also carried out for selecting out any one of types formed on the respective typewheels.

A type hammer or cam 121 is slidably keyed at 121a to an elongated keyway 123 formed longitudinally on an elongated rotatable shaft 122 which is adapted to be driven from second pulse motor 138 through a shaft coupling 135.

Under these conditions, when an electric pulse is fed, as will be later described hereinafter, to the second pulse motor 138 the shaft 122 is rotated a complete revolution and the camming tip 121b of type hammer 121 is brought into pressure engagement with the tip end 114a of a selected one of brackets 114 which is thus urged to rotate in the counter-clockwise direction when seen in FIG. 3 for carrying out the typewriting function, as will be later described.

The housing of the second pulse motor 138 is fixedly mounted on the housing 10a of the unit 10 and the shaft 122 is rotatably mounted in proper bearings mounted in the same housing, although not shown.

As most clearly seen in FIGS. 4 and 5, carriage 217 is mounted slidably on a shaft 218 which is fixedly mounted in proper mounts in the housing 10a of the unit 10, although not shown. Carriage 217 mounts fixedly a U-member 99, the flanges of which are formed with projections 98 through which the shaft 122 passes. Type hammer 121 is positioned between these projections 98, as most clearly seen in FIGS. 4–5, although in FIG. 3 this construction has been deleted for simplicity.

Third pulse motor 229 is, although not shown, fixedly mounted in the housing 10a, and the rotor of this motor is drivingly connected through a shaft coupling 97 to a rotatably mounted shaft 228, the bearings therefor being however omitted from the drawings for simplicity. At an intermediate point on the shaft 228, a bevel gear 226 is slidably mounted, yet it is non-rotatable relative to the shaft. For shifting, there is provided a shifter projection 227 which is fixedly mounted on the movable carriage 217 and kept in contact with the rear surface of the boss 226a of bevel gear 226 (see FIG. 5). Bevel gear 226 meshes with gear 223 fixedly mounted on lateral shaft 225 which is supported rotatably in turn in a bracket or gear frame 222 depending from the carriage 217. On the opposite end, see FIG. 3, of the lateral shaft 225, a gear 224 is fixedly mounted and kept in meshing engagement with a rack 233a which is made integral with a slide 231. This slide 231 is formed with a pair of separated projecting arms 231a and 231b, FIG. 9, through which the shaft 119 slidably passes, said arms confining the group of type wheels 111 in their relative position.

As most clearly seen in FIG. 3, the machine is provided with a conventional platen 130 which is rotatably mounted in suitable bearings, not shown, mounted on the machine housing 10a, which is adapted to feed intermittently a typewriting paper 131 around the platen as is conventional, although the feed mechanism has been omitted from the drawings for simplicity. A conventional ink ribbon 132 is also shown only schematically.

At the rear side of the carriage and in proximity of the platen, a vertically directing curved plate 96 is provided and mounted rigidly on the carriage, substantially in parallel with the longitudinal axis of the platen 130. At the both ends of the plate 96, as clearly seen in FIG. 9, guide rolls 60 and 61 are rotatably mounted thereon, for guiding shiftably the ink ribbon 132.

On the front part of the carriage 217, a horizontally arranged plate 95 is fixedly mounted, as most clearly shown in FIGS. 4–5. Four roller posts 62–65 are rotatably mounted on the plate 95 at proper mutual distances, for guiding the ink ribbon, which is delivered from a first spool mounted on one of the rotatable spool mounts 93 and 93a through ribbon guides 63, 62, 60, 61, 65 and 64 to a second spool mounted on the other rotatable mount, or vice versa, in a conventional manner. These spool mounts are rotatably mounted on the carriage 217 at suitable positions and arranged to be driven from the shaft 122 by utilizing conventional transmission means, not shown.

Slide 231 is rigidly formed with a pair of movable guide rails 85 and 85a which are kept in rolling engagement with a plurality of guide rollers 239a, 239b, 239c, 239d, 238e and 239f which are rotatably mounted on the carriage 217.

Gear frame 222 mounts rigidly a channel-shaped member 94 which is kept in positive engagement with an endless belt 221 by engaging a tooth groove on the belt at a predetermined position so as to be carried by the latter in unison, this engaging relation being most clearly seen in FIG. 5. The belt is kept in meshing engagement with a drive gear 220a and a follower gear 220b, said drive gear being keyed to shaft 50 which is drivingly connected with the rotor of fourth pulse motor 220, the housing of which is rigidly mounted on the base plate at 49, FIG. 1, of the upper machine part. The follower gear 220b is rotatably mounted on a stationary shaft 48. Although not shown, proper mounting means are provided on the base plate so as to support these shafts 48 and 49 in parallel relation to each other for performing proper mounting function for the both gears 220a and 220b.

The operation of the aforementioned typewriter machine is as follows:

At first, power supply on-off switch 106 is depressed so as to supply electric power through cords 87 and 88 from a power supply, not shown, to a main motor, not shown, and the rotor windings, not shown, of several pulse motors as well as other electrical constituents of the machine.

Next, start key s4 is depressed so as to feed punched tape 89 to travel at a predetermined speed past a reading head contained in the section 12. When the head senses the first coded information, or more specifically a "return code" in a conventional manner, a specifically selected number of binary coded pulses is fed from a control circuit having an arrangement similar to that shown in FIG. 21 and contained in the combined unit 15 to pulse motor 220 so as to drive the timing belt 221, in the counter-clockwise direction when seen in FIG. 5, whereby the carriage 217 and the bracket or gear support 222 fixedly attached thereto are moved in unison with the belt. Naturally, the carriage 217 slides along guide shafts 218 and 219. Thus, typewheel 240 supported through supporting arm 240a by the carriage is shifted in unison therewith to a selected typing position, normally at a position in proximity of the left-hand side edge of the paper 131 on the platen 130, for carrying out the preparatory spacing operation as in the conventional comparative machines. In this case, gear 226 mounted on the carriage slides correspondingly along the shaft 228 which may be called "typewheel selection shaft," while hammer or cam 121 moves in unison along the shaft 122 which may be called "hammer operating shaft." Therefore, these working parts 226 and 121 will participate in the preliminary spacing operation.

Alternatively, when return key 91 is depressed in advance of hand-typing relying upon conventional hand-operated key group 100, similar effects can be obtained and may be utilized for punching the tape when it is placed at the left-hand side of the machine, or in the section 13.

When the tape 89 further advances and the reading head senses a character or the like information in the form of a plurality of coded and laterally aligned holes in the tape, it delivers in the similar manner a specific series of pulses through the intermediary of the control circuit to pulse motors 137 and 229 conventionally in a divided manner as described below by reference to FIG. 21.

In fact, under these conditions of the machine, the last selected position of the type on one of the typewheels, say 111r, now in physical opposition to the guide 240, which type was typed in a previous typing operation in advance of the aforementioned preparatory spacing or returning operation, is sensed in the manner to be described and converted into the form of a specific group of pulses, and the aforementioned pulse group specific to the presently selected position of the said type is subtracted algebraically from said previously selected type-position identifying pulses by means of a processing unit contained in the control circuit. For instance, when the resulted pulses are fed to motor 229 for selectively and horizontally, positioning a typewheel 111s to its presently selected ready-typing position in registration with the guide 240. Similar pulses are conveyed to motor 137 for rotating the typewheels as a group so as to practically select a specific one of the types carried on the peripheral surface of the typewheel 111s. This rotating selection may be called "vertical positioning" of the typewheels.

When the pulse series alloted to the pulse motor 229 is fed thereto in the aforementioned manner, the rotor of the motor rotates a specifically selected angle corresponding to the fed pulse series in counter-clockwise direction when seen in FIG. 4, whereby the shaft 228 and its attached gear 226 are rotated in unison therewith.

Rotation is thus transmitted to the gear 223, lateral shaft 225 and spur gear 224 so as to rotate it in the counter-clockwise direction in FIG. 5 and move the rack 233a of movable shifter 233, made integral therewith, from right to left in FIG. 5, along with the comb 233b against which the group of hammer levers 114 abuts under pressure by the resilient tension force exerted by respective tension springs 245. Therefore, all the hammer levers 114 are shifted horizontally in unison with the movement of shifter 233.

A pair of front and rear guide rails 85 and 85a fixedly attached to the shifter 233 are positively guided by rolling engagement with guide rollers 239a, -b, -c, and -d, and 239e and -f, respectively, for accurately guiding the shifter along its predetermined travel passage along the shaft 119. By this operation, the selected typewheel, say 111s, has been brought into registration with the guide 240 so as to occupy the ready-typing position as determined by the feed selection signal from the reading head.

At the same time, a control signal pulse series is fed to the pulse motor 137 and thus, motion is transmitted to the shaft 119 whereby the latter is caused to rotate a specific angle in one or another direction, as the case may be, as determined by the number and polarity of the feed pulse series, as is conventional in the pulse motor technique. Motion is thus transmitted from the shaft 119 through gears 117, 115 and 113 to the typewheel series, whereby a specifically selected type on the registered typewheel 111s is brought into the ready-typing position as shown by a symbol "M" in FIG. 6. At this moment, the vertical selection has been completed.

As will be later described hereinafter, when the both horizontal and vertical selecting operations have been completed in the aforementioned way, a pulse is fed to the third pulse motor 138 which is thus actuated to rotate a complete revolution in the counter-clockwise direction when seen in FIG. 3 and then stops. Motion is therefore transmitted from the motor to its shaft 122 which may be called "hammer actuator shaft," whereby the hammer cam 121 is rotated in the clockwise direction as shown by a small arrow "x" in FIG. 4 until it strikes against the tip end 114a of one of type levers 114, which is attributed to the typewheel 111s now selected out and kept in its operating position. This action will be clearly seen from FIG. 3 wherein the cam 121 is just in striking engagement with the tip end of the type lever 114 which is however in this figure attributed to a different typewheel 111 from that denoted 111s under consideration. By this striking action, the related type lever 114 is rotated forcibly around shaft 119 in the counter-clockwise direction in FIG. 4, against the resiliently urging force provided by coil spring 245.

Since gears 113 and 115 are kept in meshing engagement with each other and mounted freely rotatably on the respective shafts 112 and 116 which are mounted in turn fixedly on the type lever 114, as most clearly seen from FIGS. 10–11, the sudden rotational movement of the type lever about the shaft 119 will come the intermediate gear 115 to perform a planetary motion on and around the gear 117, while the former rotates about its own axis in the counter-clockwise direction in FIG. 6 and the typewheel gear 113 meshing with the intermediate gear will rotate about its shaft 112 accompanying its typewheel 111s in this case. Therefore, the typewheel 111s is urged to move from the position shown in FIG. 6 towards the platen 130 and into the wheel-guiding gap 240a of the guide 240, to the position shown in FIG. 7. In this case, the selected-out type located at "M" in FIG. 6, is brought into striking contact through the intermediary of ink ribbon 132 with the typewriting paper 131 in the destined typing position which has been confined in the typing gap 240a.

At this moment, detent lever 255 swivels forcibly under the action of tension spring 254 and around pin 260 in the counter-clockwise direction so as to bring its detent 256 into meshing engagement with a tooth space, as shown in FIG. 7 in dotted lines, for positively checking any unintentional rotation of the typewheel in the course of the typing operation thereof. Thus, a typing operation has been completed in connection with the selected-out character on the typewheel 111s.

Then, the typewheel 111s is repelled from the surface of the platen 130, or more specifically from the ink ribbon 132, under the influence of the resilient reaction force provided by the resilient material, such as rubber, of the platen, in combination with that provided by return spring 245 into its initial locked position where it is brought again into engagement with the attributed one of the recesses defined by tooth projections on the comb 233b.

As will be later described, an electric pulse is fed to pulse motor 220 upon completion of the aforementioned typing operation, thereby the motor being rotated a predetermined angle in the clockwise direction in FIG. 5, for carrying out a regular spacing operation. Thereby, the carriage 217 is moved a step in the right-hand direction in the same figure and thus wheel guide 240 will travel the same step in unison therewith.

Next referring to FIG. 20, numeral 310 denotes a rotatable code disc fixedly attached to the shaft of rotor 137a of pulse motor 137 and housed within the interior of the motor housing. An end wall of the latter carries an illuminating lamp 311, although the detailed mounting means therefore are omitted from the drawing. The disc 310 is provided with a number of radially arranged perforations such as denoted 310a, a radial row of these perforations are arranged in the manner similar to those adopted for the code punched tape commonly used in the telecommunication technique and corresponding to each respective type position on the periphery of the typewheel when seen in common to all the typewheels. Each radial row of these coded perforations, in this case, comprises four bits in binary logic.

Although the mounting means are not specifically shown, a series of four photoelectric cells 312–315 is fixedly mounted through a supporting arm 316 on the inside wall surface of the motor housing. Therefore, when the pulse motor 137 is kept in a stationary position, this position is sensed photoelectrically by photoelectric elements 312–315 by receiving light beams from the lamp 311, through perforations 310a, and an output signal current will be delivered from these elements through conductive leads 317 to a conventional amplifier 318, FIG. 21, thence through leads 319, only schematically shown by a cord for simplicity which will apply to the further description hereinbelow, to a first gate circuit 320, only schematically shown in a block. At the same time, the same signal is conveyed through lead 321 to a second gate circuit 322.

Four bits of the pick-up signal by the reading head from the punched tape, as was described hereinbefore and comprising seven bits in total, are fed through leads 323 to second gate circuit 322 and simultaneously through leads 324 to first gate circuit 320. These different input signals are subtracted from each other in binary logical manner. The differential result obtained in the first gate circuit is utilized for stepping control of the typewheel assembly, while that obtained in the second gate circuit is utilized for determining the rotational direction of the typewheel assembly, because the rotation range at each arrival of said input signal is limited to maximum 180 degrees. The output signal from the first gate circuit 320 is fed through a single lead 325 to pulse generator 326 which is so designed that it continues to deliver its output signal pulses, having a time interval of 3 ms., as an example, therebetween until its input signal becomes nil. The pulse series from the generator 326 is conveyed through a further lead 327 to pulse motor drive circuit 329 which drives pulse motor 137. The rotational direction of the latter is determined by the output "1" or "0" from second gate circuit 320, which output is conveyed therefrom through a single conductor 328 to the circuit 329.

Pulse motor 229 is fitted with similar photoelectric and electronic control means as described above in connection with pulse motor 137, and thus further detailed description thereof may be dispensed with, without sacrificing better understanding of the invention. It should be noted however in this case that 3-bit input signals are employed in place of 4-bit one.

The pick-up signal by the reading head from the punched tape is fed, on the other hand, through leads 80 to OR-gate 340, FIG. 22, and an output signal as at (I) in FIG. 23 is thereby delivered through lead 341 to delay circuit 342 which delivers a pulse as at (II) in the same figure to monostable multivibrator 344. The latter is actuated in this way to deliver a pulse at a time lag, 35 ms., as an example, when counted from the rising or leading edge of the input signal conveyed through the leads 80 to the OR-gate 340.

The output pulse from the multivibrator 344 is fed through lead 345 to pulse motor drive circuit 346 which is thus energized and delivers a drive pulse through lead 347 to the related pulse motor 138, as was described briefly hereinbefore by reference to FIGS. 3–7. Therefore, it will be acknowledged that the pulse motor 138 operates only when three motors 137, 220 and 229 have completed once their operation, generally speaking.

Upon completion of the said operation of the motor 138, then a signal is supplied to the pulse motor 220 so as to actuate the latter as was described hereinbefore by reference to FIG. 4. For this purpose, similar circuit as was described in connection with motor 138 may be provided, although not shown in the drawings for simplicity.

For performing a typewheel selection, a part of the signal, comprising three bits of seven bits, is conveyed equally from the reading head through leads 80, thence through chord at 330, to a similar control circuit 331, wherein it is processed in the manner as set forth above and conveyed through lead 333 to the third pulse motor 229. Thus, the specifically selected typewheel selection can be performed as will be clear from the foregoing.

It is to be understood that the above-described machine is illustrative of the application of the principles. In this case, other detailed arrangements may be devised by those skilled in the art without departing from the spirit and scope of the invention.

What is claimed is:

1. A typewriter comprising a housing, carriage means slidably mounted in said housing, first drive means for slidably moving said carriage means comprising first motor means and timing belt means positively interconnected between said motor means and said carriage, slider means slidably mounted on said carriage, second drive means for slidably moving said slider means relative to said carriage means comprising second motor means and a positive drive gear train interconnecting said second motor means and said slide means, a plurality of adjacent type levers mounted for sliding movement with said slider means relative to said carriage means and for pivotal movement relative to said slider means, a typewheel rotatably mounted on each of said type levers, third drive means for rotating said typewheels in unison comprising third motor means and a positive drive gear train interconnecting said third motor means and each of said typewheels, hammer means mounted on said carriage means adjacent said slider means for rotary movement only relative to said carriage means, fourth drive means for rotating said hammer means comprising fourth motor means positively and directly coupled to said hammer means and latch means associated with each of said type levers pivotally mounted on said slider means for releasable latching engagement with the teeth of the positive drive gear train drivingly connected to each of said typewheels.

2. A typewriter as set forth in claim 1 further comprising typewheel guide means fixedly secured to said carriage means for cooperation with a selectively actuated typewheel.

3. A typewriter as set forth in claim 1 wherein each of said motors is an electric pulse motor adapted to be driven to predetermined increments in response to output signals from a suitable data storage means.

References Cited

UNITED STATES PATENTS

| | | | |
|---|---|---|---|
| 896,913 | 8/1908 | Hopkins | 197—56 |
| 2,165,224 | 7/1939 | Chisholm | 197—55 XR |
| 2,831,424 | 4/1958 | MacDonald | 197—49 XR |
| 2,865,486 | 12/1958 | Capellaro | 197—55 XR |
| 2,945,091 | 7/1960 | Conepa | 197—55 |
| 3,042,174 | 7/1962 | Howard | 197—55 XR |
| 3,168,182 | 2/1965 | Bernar et al. | 197—55 |
| 3,221,863 | 12/1965 | Pietzsch | 197—55 XR |
| 3,256,969 | 6/1966 | Bretti | 197—16 XR |

ROBERT E. PULFREY, *Primary Examiner.*

E. S. BURR, *Examiner.*